Dec. 30, 1930.     E. T. HEWITT     1,787,374
STEAM TRAP
Filed June 16, 1928     2 Sheets-Sheet 1

E. T. Hewitt, INVENTOR
BY Victor J. Evans
ATTORNEY

Dec. 30, 1930.  E. T. HEWITT  1,787,374
STEAM TRAP
Filed June 16, 1928  2 Sheets-Sheet 2
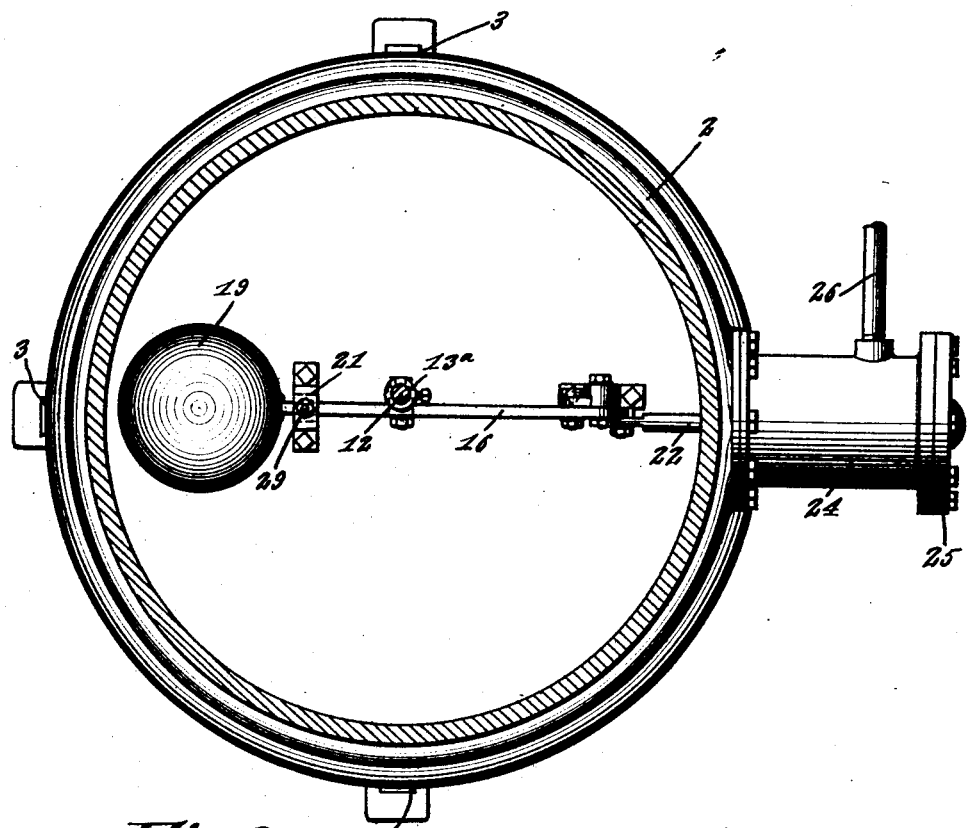
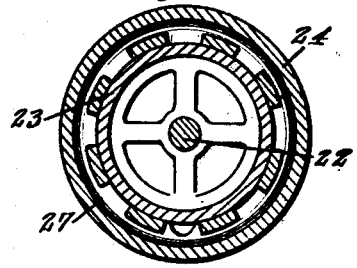
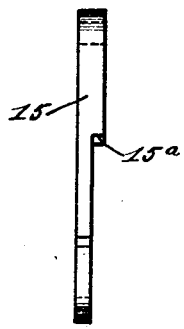
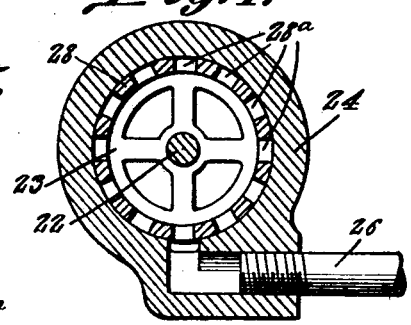
E. T. Hewitt, INVENTOR
BY Victor J. Evans
ATTORNEY Patented Dec. 30, 1930

1,787,374

UNITED STATES PATENT OFFICE

EDMUND T. HEWITT, OF ST. LOUIS, MISSOURI

STEAM TRAP

Application filed June 16, 1928. Serial No. 286,037.

This invention relates to a steam trap for condensed water from a steam heating plant designed to effect quick release by a simple release mechanism.

In carrying out the invention, I provide an air tight trap, having pivotally supported therein a float to follow the level of the condensed water with means as to predetermine the rise of the water level to release a latch and permit an auxiliary float to actuate a balanced piston to quickly open a drain port and permit escape of the condensed water.

The several features of novelty will be more fully hereinafter described and will be definitely indicated in the appended claims.

In the accompanying drawings illustrating the invention—

Figure 2 is a horizontal section on the plane 2—2 of Figure 1.

Figure 3 is an enlarged section of a cylinder and piston for operating the drain, on the plane 3—3 of Figure 1.

Figure 4 is an enlarged section of the cylinder on the plane 4—4 of Figure 1.

Figure 5 is a side view of the trip arm for the piston.

Figure 1:
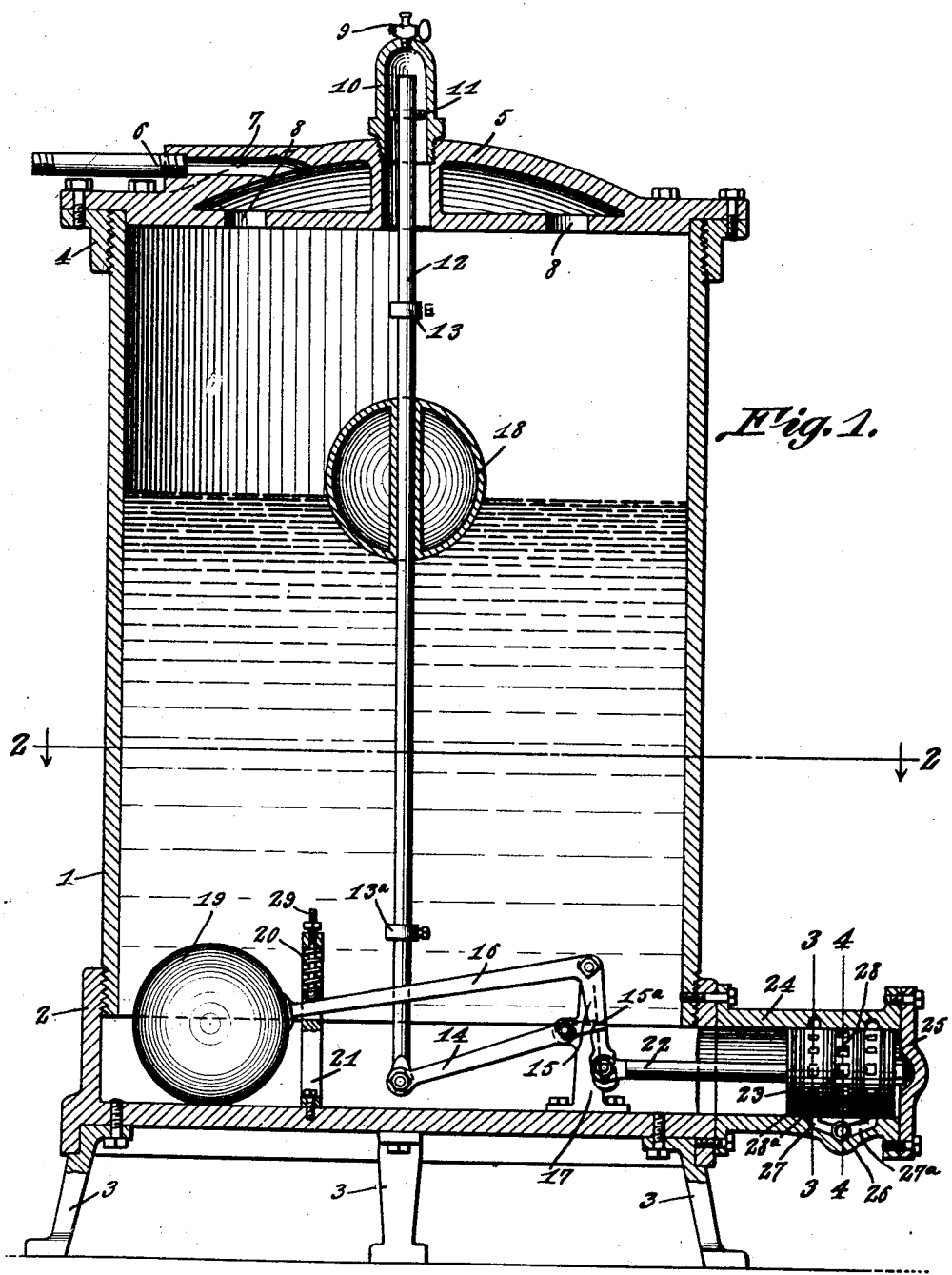
Figure 1 is a median vertical section of a trap embodying my improvements.

Referring now in detail to the drawings—1 represents a cylindrical trap mounted by a screw thread on a base 2, having a plurality of bolted feet 3. On the top of the trap is a flanged ring 4, connected with the cylinder by a screw thread. On a flange of the threaded annular member 4 is bolted a dome-like top plate 5 having an inlet 7, provided with a screw threaded joint to accommodate an inlet pipe 6 for condensed steam. The top plate has a plurality of ports 8 permitting discharge into the cylinder 1. A pet cock 9 controls escape of air to permit the water level to rise and is mounted in a tubular extension of the dome 10 carrying a spider 11 to guide the controlled rod 12. Collars 13—13a are adjustably mounted on the rod 12 to permit a limited movement of a pivoted rod 14 supported on a standard 17 and provided with a trip latch 15 cooperating with a notch 15a in a bell crank lever 16, pivoted on the stand 17. The float 18 is mounted in sliding relation on the rod 12 so as to follow the level of the condensed water, and when said level reaches the limit to engage the adjustable collar 13, the latch 15 is released permitting a float 19 to rise against the tension of a spring 20. Seated in a standard 21, is a rounded nose of the threaded spring pressed pin 29, being in alinement with the arm 16 of the elbow lever controlling the piston rod 22.

Mounted on the piston rod is a hollow piston 23 normally pushed to the rear of a cylinder 24 in close relation to the cylinder head 25. The cylinder 24 carries a drain pipe 26, provided with ducts leading to opposite sides of the piston and in normal position in communication with the condensed water in equalized pressure on both sides of the piston. The piston carries a ported piston ring 28, carrying a plurality of ports 28a, which when the piston rod 22 is shifted forward brings the ports into register with the drain opening 27, communicating with the drain pipe 26. In this position of the piston, the water also passes through the latter and is discharged through the passage 27a which also communicates with the drain pipe 26. In a normal position however, these ports are covered and both sides of the piston have an equalized pressure of the hydraulic head of the condensed water. When the water lever 1 rises sufficient to engage the collar 13 by the float 18, the latch 15 releases the bell crank lever 16, and permits the float 19 to shift the piston into register with the drain port 27, thereby permitting the condensed water to escape. This action will be instantaneous and withdraw the condensed water as float 18 sinks to the lower collar 13a and the spring 20 retracts and lowers the float 19 to contact with the base and the collar 13a in the rod 12 causes re-engagement of the latch 15 to restore the trigger action. During this operation the piston has been shifted under the strength of the spring 20 into normal position, indicated in Figure 1. When the action again proceeds as before described causing a gradual rising of the float 18 from the lower limit of the collar 13a and gradually shifting the float 18 along the rod as the water accumulates until a re-engagement with the collar 13, a new discharge of the condensed water will be effected, as before described.

Having thus described my invention, what I claim is new and desire to secure by Letters Patent is—

1. A steam trap comprising a reservoir for condensed water, a reciprocable piston controlling a drain in the bottom thereof, a float actuated on a drainage of water from the trap to control said piston, an arm actuated by the float to open a vent in the drain, an auxiliary float on a vertical rod in slidable relation to the arm, a latch controlling the piston, and a pair of fixed collars on the rod at different fluid levels to engage the auxiliary float and set or unset the latch to control the drain.

2. A steam trap comprising a reservoir for condensed water, and including a cylindrical extension having a drain opening, a piston operating in said extension and controlling said opening, a pivoted bell crank lever having one end connected with the piston rod, a float carried by the other end thereof, a latch cooperating with said lever for holding said piston normally positioned to cover said drain opening, adjustable float actuated means for effecting a release of said lever at a predetermined water level, whereupon said lever is actuated by the float carried thereby to shift said piston away from the drain opening, and resilient means engaging said lever and automatically returning said piston to normal position with the fall of the level of water within the reservoir.

In testimony whereof I affix my signature.

EDMUND T. HEWITT.